No. 642,646. Patented Feb. 6, 1900.
H. H. & G. P. THOMSON.
HORSE DETACHER.
(Application filed Apr. 14, 1899.)
(No Model.) 2 Sheets—Sheet 1.
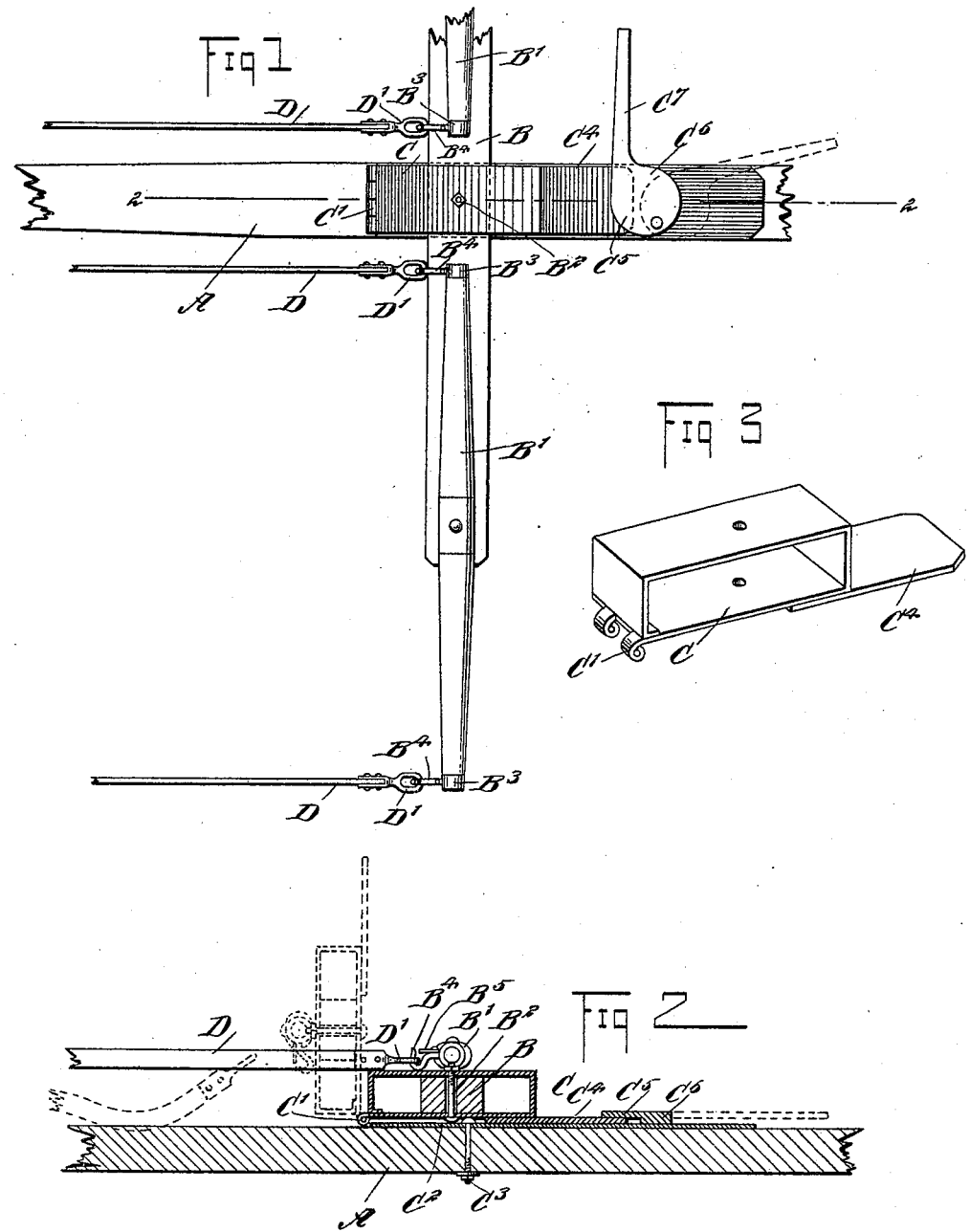
WITNESSES:
INVENTORS
Henry H. Thomson
George P. Thomson
BY
ATTORNEYS.

No. 642,646. Patented Feb. 6, 1900.
H. H. & G. P. THOMSON.
HORSE DETACHER.
(Application filed Apr. 14, 1899.)
(No Model.) 2 Sheets—Sheet 2.
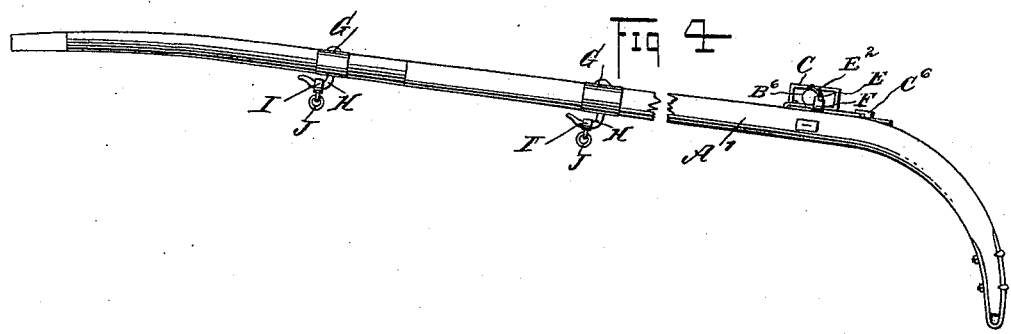
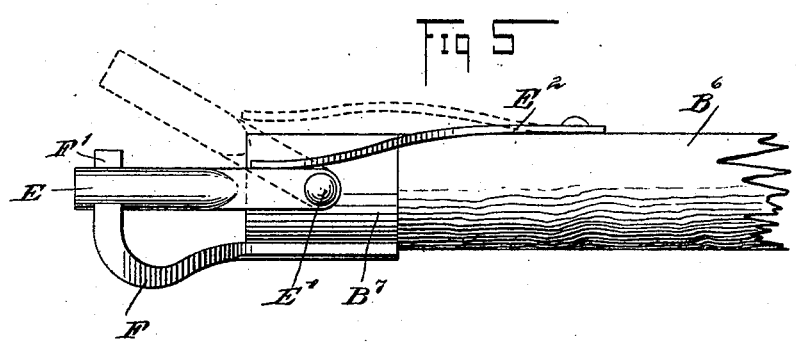
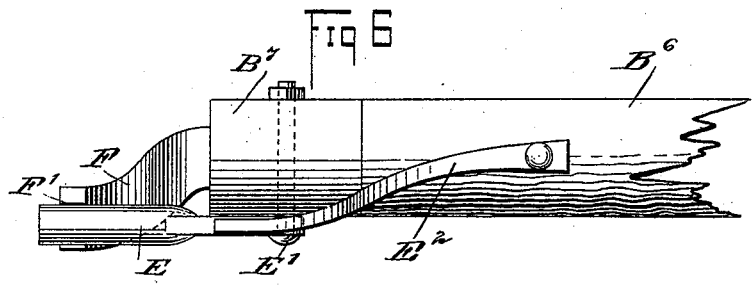
WITNESSES
INVENTORS
Henry H. Thomson
George P. Thomson
BY
ATTORNEYS

UNITED STATES PATENT OFFICE.

HENRY HIBBARD THOMSON AND GEORGE PRICHARD THOMSON, OF WAKARUSA, KANSAS.

HORSE-DETACHER.

SPECIFICATION forming part of Letters Patent No. 642,646, dated February 6, 1900.

Application filed April 14, 1899. Serial No. 713,022. (No model.)

*To all whom it may concern:*

Be it known that we, HENRY HIBBARD THOMSON and GEORGE PRICHARD THOMSON, of Wakarusa, in the county of Shawnee and State of Kansas, have invented a new and Improved Horse-Detacher, of which the following is a full, clear, and exact description.

The object of the invention is to provide a new and improved horse-detacher which is simple in construction, easily applicable to single or double rigs, and arranged to permit the driver or other person to almost instantly detach a horse or team from a vehicle.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 1 is a plan view of the improvement as applied to a two-horse vehicle. Fig. 2 is a sectional side elevation of the same on the line 2 2 in Fig. 1. Fig. 3 is a perspective view of the carrier for the doubletree pivot-pin. Fig. 4 is a side elevation of the improvement as applied to shafts for a single horse. Fig. 5 is an enlarged rear elevation of one end of the singletree, and Fig. 6 is a plan view of the same.

The improvement illustrated in Figs. 1, 2, and 3 is applied to a two-horse vehicle having a pole A, over the rear portion of which extends the doubletree B, carrying the singletrees $B'$ and mounted to turn on a pivot $B^2$, held in a carrier C, connected at its forward end by a hinge $C'$, having a plate $C^2$, bolted or otherwise fastened to the pole A. The carrier C is in the shape of a box or casing open transversely to permit a free swinging of the doubletree B on its pivot-pin, according to the pull or power of the two horses forming the team. The rear end of the carrier C is provided with a tongue $C^4$, extending under the overhanging portion $C^5$ of an eccentric cam $C^6$, pivoted to the tongue A, and provided with a handle $C^7$ under the control of the driver or other person.

When the several parts are in the position shown in Figs. 1 and 2, the overhanging portion $C^5$ of the cam $C^6$ locks the tongue $C^4$ and the carrier C in place on the pole A, and when it is desired to detach the team from the vehicle it is only necessary for the operator to swing the handle $C^7$ rearwardly into the position shown in dotted lines in Fig. 1 to move the overhanging portion $C^5$ of the cam out of engagement with the tongue $C^4$ to allow the carrier C to swing upward and forward into the position shown in dotted lines in Fig. 2. When this takes place, the loops or rings $D'$ of the traces D slip out of the hooks $B^4$, formed on the ferrules $B^3$, attached to the outer ends of the singletrees $B'$, so that the team becomes disconnected from the singletrees, and consequently from the vehicle, to allow the team to dash on without, however, pulling the vehicle along. Thus it is evident that in case of a runaway the simple release of the tongue $C^4$ by the cam $C^6$ permits an almost instant detachment of the horses from the vehicle, as it is evident that when the carrier C is unlocked a further pull on the singletrees and the doubletree by the horses causes a forward swinging of the carrier to bring the singletrees finally in such a position that the loops or rings $D'$ slide out of the hooks $B^4$, as will be readily understood by reference to the dotted lines in Fig. 2. When the singletrees are in a normal position, as shown in full lines in Figs. 1 and 2, then an accidental detachment of the loops or rings $D'$ from the hooks $B^4$ is not liable to take place, especially as a tongue $B^5$ extends over a portion of the open end of the hook, said tongue being made of leather or other flexible material, so as to readily yield and allow the loops or rings $D'$ to slip over the hooks when the carrier C is in a forward position, as above explained. It is understood that when the carrier C swings up into the position shown in dotted lines in Fig. 2 the open ends of the hooks $B^4$ extend forwardly, so that the loops or rings $D'$ readily slide out of the said hooks, and consequently the animal becomes detached.

For single rigs we prefer the arrangement shown in Figs. 4 to 6, and in this case the singletree $B^6$ is pivoted in a carrier C of the construction described and shown in Fig. 3 and hinged to the shafts $A'$ to permit the casing to swing over to a front position when released by the driver manipulating the cam $C^6$, as above described, to bring the singletree in position for releasing the traces. The singletree carries at each end a ferrule $B^7$, on the rear side of which is fulcrumed at $E'$ a pin E, adapted to engage an aperture in the trace of the harness. The pivotal end of the pin E is pressed on by a spring $E^2$, secured to the singletree $B^6$ to hold the free end of said pin normally in the forked open end $F'$ of a keeper F secured to or forming part of the ferrule $B^7$. The pin E is adapted to swing upward against the tension of its spring $E^2$ and out of engagement with the keeper F to release the trace at the time a pull is exerted on the trace and the singletree, so as to allow the trace to pull in a longitudinal direction on the pin to swing the same out of engagement with the forked end $F'$ and allow the trace to slip off the pin at the time the carrier C has swung forward after its release by the driver in the manner previously described. Thus the animal wearing the harness and held in the shafts $A'$ becomes instantly detached from the singletree.

On the side bars of the shafts $A'$ are secured rings G, located one in front of the other, as plainly indicated in Fig. 4, a hook H being secured on each ring at the under side thereof and extending in a forward direction, as is plainly shown in said figure. Each hook H is adapted to receive a ring-strap or like device I, supporting a ring J, in which the holdback-straps of the harness are secured at the time of hitching the animal to the buggy at the shafts. When the animal moves forward after the trace is detached from the singletree, as previously explained, then the pull exerted by the holdback-straps on the rings J causes the holding device I to slide off the hooks H, so that the animal's harness becomes completely detached from the shafts. It is understood that this special construction of singletree shown in Figs. 5 and 6 may be readily applied to the singletrees $B'$ shown in Fig. 1, or the construction of singletrees and traces shown in Fig. 1 may be used for a single rig.

Having thus fully described our invention, we claim as new and desire to secure by Letters Patent—

1. In a horse-detacher, a carrier for a doubletree or singletree provided with a rearwardly-projecting tongue, said carrier being adapted to be hinged at its forward end to a pole or shafts, and a cam-lever adapted to be pivoted in rear of the carrier and having an overhanging portion for extending over the tongue of the carrier, substantially as described.

2. In a horse-detacher the combination with a pole or shafts, of a casing in which a doubletree or singletree is pivoted, said casing being hinged at its front end to the tongue or shafts and provided at its rear end with a tongue, and a pivoted cam-lever in rear of the casing and having an overhanging portion for extending over the tongue of the casing to lock the same in position, substantially as described.

3. In a horse-detacher, the combination with a singletree mounted to have a quarter-turn imparted to it, of pivoted and spring-pressed trace-pins on the rear side of the ends of the singletree and adapted to engage apertures in the traces, and fixed keepers at the ends of the singletree and with which the trace-pins are normally held in engagement, substantially as and for the purpose set forth.

4. In a horse-detacher, the combination with a singletree mounted to have a quarter-turn imparted to it, of trace-pins pivoted on the ends of the singletree on the rear side thereof, and adapted to engage apertures in the trace, keepers carried by the singletree, each for normally holding a pin in position and allowing said pin to swing out of the keeper to release the trace, upon giving a quarter-turn to the singletree, and a spring pressing on said pin, to hold the same normally in engagement with the keeper, substantially as shown and described.

5. In a horse-detacher of the character described, a singletree provided with trace-pins pivoted to the rear side thereof near the ends and projecting beyond the same, fixed forked keepers projecting from the ends of the singletree and in the forks of which the pins rest, and a spring having one end secured to the singletree and its other end bearing on the pins to hold them in position, substantially as described.

HENRY HIBBARD THOMSON.
GEORGE PRICHARD THOMSON.

Witnesses:
JONAS ALBERT SNYDER,
SAMUEL TAYLOR MELLOR.